B. Shirley.
Hay Loader.

N°70032. Patented Oct. 22, 1867.

Witnesses  Inventor

BRADFORD SHIRLEY, OF MORAVIA, NEW YORK.

Letters Patent No. 70,032, dated October 22, 1867.

IMPROVEMENT IN HAY-RAKERS AND LOADERS.

The Schedule referred to in these Letters Patent and making part of the same.

TO ALL WHOM IT MAY CONCERN:

Be it known that I, BRADFORD SHIRLEY, of Moravia, in the county of Cayuga, and State of New York, have invented certain new and useful Improvements in Machines for Raking and Elevating Hay, Straw, and analogous material; and I do hereby declare that the following is a full and exact description thereof.

I will first describe what I consider the best means of carrying out my invention, and will afterwards designate the points which I believe to be new therein. The accompanying drawings form a part of this specification.

Tints are employed merely to aid in distinguishing parts, and do not indicate material. The material of all the parts may be hard wood and iron or steel.

A is a rigid framework. B B are supporting wheels, turning loosely on an axis, $b$, mounted in the framework, as represented. The inner ends of the hubs of the wheels B B are marked $B^1$, from each of which motion may be communicated to the revolving rake through a pawl and ratchet. C C C C are light wheels, connected firmly together by rods, $C^1$, and mounted on the shaft $b$. The wheels C and connections $C^1$, thus mounted, form a rigid revolving frame, which will be designated collectively the frame C. The several wheels are grooved at their peripheries, as represented, and of a little less diameter than the supporting wheels B B. Arms or teeth, $a$, are fixed on the upper portion of the framework A, which stand in these grooves, and it follows that any hay or analogous material which is brought up by the revolution of the frame C, will be discharged upon the arms $a$, and be pushed forward by the accumulation of other material behind it. The framework A being properly connected to a wagon, as will be understood, the hay thus raised by the frame and pushed forward on the arms $a$, will be delivered into the wagon, and may there be received and stowed in any approved manner.

I will now describe the mechanism by which the hay is caught and brought up on the revolving frame.

Figure 1:
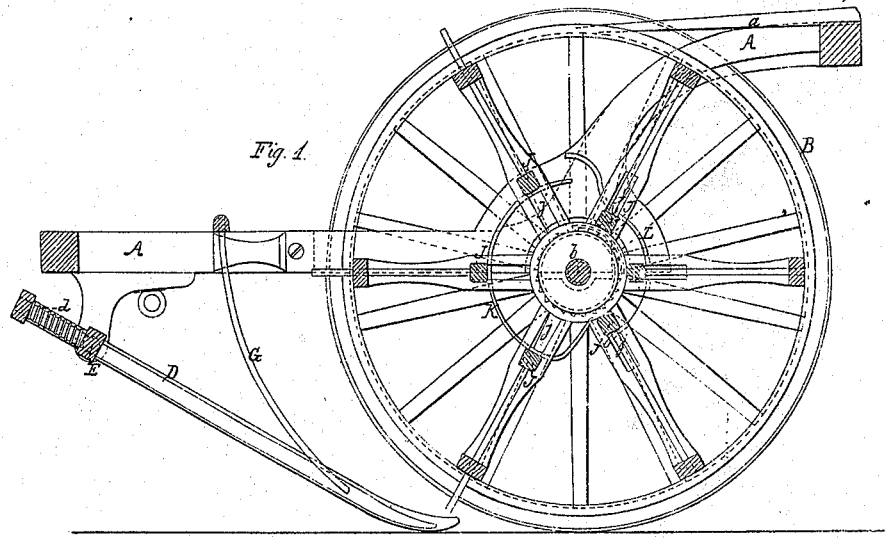
Figure 1 is a central vertical section.
Figure 2:
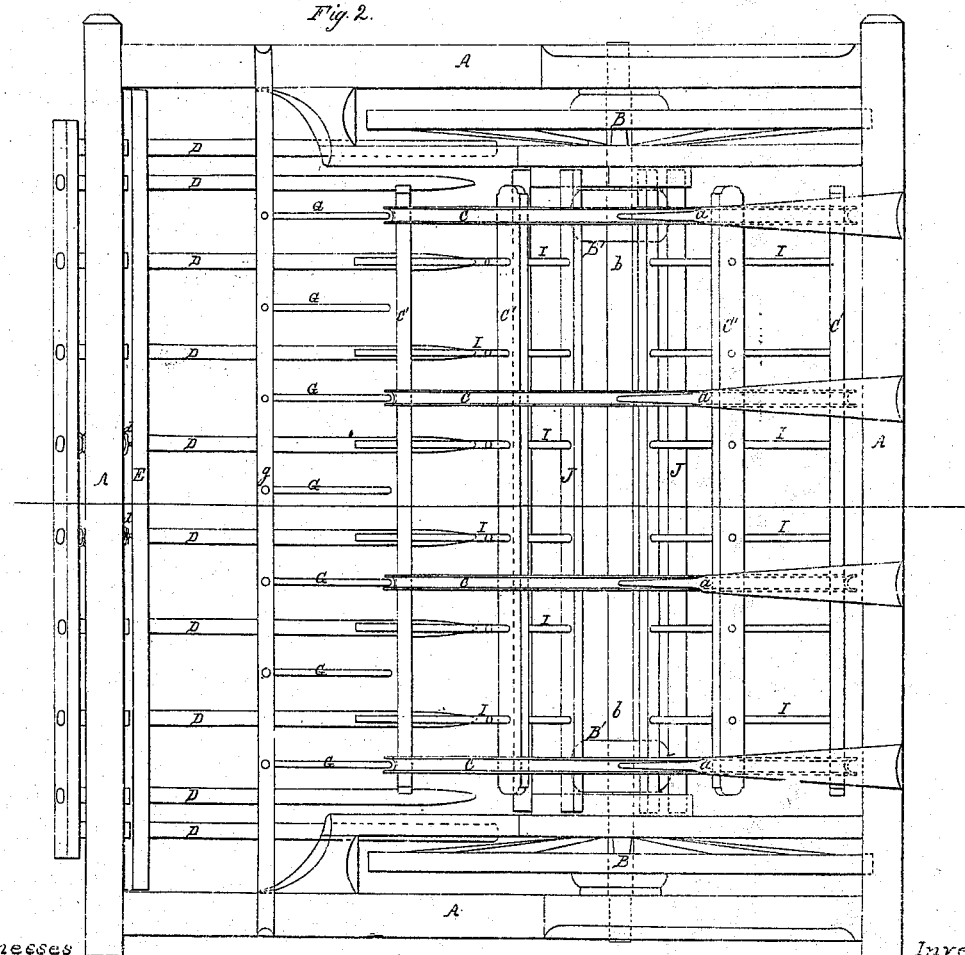
Figure 2 is a plan view of the entire machine.

D D, &c., are series of teeth, slightly rounded at the lower ends, and mounted in an inclined position on the rocking-shaft E. They are severally adapted to yield by the yielding of the springs $d$, so as to accommodate themselves severally to the inequalities in the ground, and to slide along on the surface of the ground, just behind and pretty well under the revolving frame C, before described. As the machine is drawn across the field, these teeth raise the hay from the ground. G G are a series of curved teeth, mounted on the cross-bar $g$. Their lower ends stand between the teeth D, before described. The hay lifted on the teeth D accumulates in front of the teeth G, and is crowded up the space between these latter teeth and the frame C. I I, &c., are series of parallel teeth, mounted loosely in holes in the rods $C^1$. They are compelled to turn with the rake-wheel or frame C, but are capable of radial motion outward and inward as the wheel revolves. The inner ends of the teeth I in each series are secured to a bar, J, which is free to move radially outward and inward in the slots $j$, as represented. The ends of the bars J extend outward, and are operated by certain fixed cams formed of stout curved pieces of iron fixed on the framework. These cams are represented by K and L, very clearly shown in fig. 1. The cam K is adapted to force outward the several bars J, and hold them out during a half, or about a half, of a revolution. The cam L is adapted to draw in the bars J and hold them drawn in during the remainder of the revolution. The cam K is effective during that portion of the revolution while the bars J, and consequently the connected teeth I, are rising on the back side. The cam L is effective during that portion while the said bars and teeth are descending on the front side. The hay or straw, bushes, or analogous material, which is to be raked and loaded, is caught, elevated by the teeth D, and is retained in front of the teeth G. As each series of teeth I sweeps upward past the accumulated material, it takes a portion and conveys it up to the highest point in the revolution of the frame C. There it is transferred upon the arms $a$, and ultimately pushed forward by the arrival of other material behind it until it is delivered off the front.

Having now fully described my invention, what I claim as new, and desire to secure by Letters Patent, is as follows:

1. I claim the revolving frame C, the rake-teeth I, moving radially as described, and the arms or teeth $a$, combined and arranged as represented, and adapted to operate together, substantially as and for the purpose herein specified.

2. I claim, in connection with the above-described frame C, the teeth I and $a$, or their equivalents, the cams K L, constructed and arranged as represented.

3. I claim, in combination with a revolving rake wheel or frame C, and its several connected parts, I J, and cams K L, substantially as represented, the employment of the yielding rake-teeth D, adapted to slide on the ground, and the intermediate teeth G, the whole combined and arranged for joint operation, substantially as and for the purpose herein set forth.

BRADFORD SHIRLEY.

Witnesses:
LEANDER FITTS,
S. EDWIN DALE.